United States Patent
Ortiz

(10) Patent No.: US 9,457,531 B2
(45) Date of Patent: Oct. 4, 2016

(54) BI-CAST TURBINE ROTOR DISKS AND METHODS OF FORMING SAME

(71) Applicant: HONEYWELL INTERNATIONAL INC., Morristown, NJ (US)

(72) Inventor: Milton Ortiz, Scottsdale, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 195 days.

(21) Appl. No.: 14/326,819

(22) Filed: Jul. 9, 2014

(65) Prior Publication Data

US 2014/0318729 A1 Oct. 30, 2014

Related U.S. Application Data

(62) Division of application No. 12/973,424, filed on Dec. 20, 2010, now Pat. No. 8,801,388.

(51) Int. Cl.

| | |
|---|---|
| B29D 99/00 | (2010.01) |
| F01D 5/34 | (2006.01) |
| B22C 9/02 | (2006.01) |
| B22D 19/00 | (2006.01) |
| F01D 5/30 | (2006.01) |

(52) U.S. Cl.
CPC ............ B29D 99/0025 (2013.01); B22C 9/02 (2013.01); B22D 19/00 (2013.01); F01D 5/30 (2013.01); F01D 5/34 (2013.01); *F05D 2230/21* (2013.01); *F05D 2230/236* (2013.01); *F05D 2300/175* (2013.01); *F05D 2300/6033* (2013.01); *Y02T 50/672* (2013.01); *Y02T 50/673* (2013.01)

(58) Field of Classification Search
CPC .. B29D 99/0025; B22D 19/00; B22D 19/14; B22D 19/04; F05D 2230/21; F05D 2300/175; F05D 2300/6033; F05D 2230/236; F01D 5/282; F01D 5/284; B23P 15/006; B23P 2700/00; Y10T 29/49316; Y10T 29/49321; Y10T 29/49325; Y10T 29/49327

See application file for complete search history.

(56) References Cited

U.S. PATENT DOCUMENTS

| | | | | |
|---|---|---|---|---|
| 1,005,736 | A * | 10/1911 | Wilkinson | B22D 25/023 164/11 |
| 4,063,939 | A * | 12/1977 | Weaver | B22F 5/04 29/889.21 |
| 4,152,816 | A * | 5/1979 | Ewing | B22F 7/062 228/104 |
| 4,195,683 | A * | 4/1980 | Blazek | B22D 19/00 164/10 |
| 4,323,394 | A * | 4/1982 | Hoffmuller | B22F 7/064 29/889.21 |
| 4,417,854 | A | 11/1983 | Cain et al. | |

(Continued)

FOREIGN PATENT DOCUMENTS

WO  2010094273 A2  8/2010

OTHER PUBLICATIONS

EP Search Report for Application No. 11193628.2, Dated May 20, 2015.

(Continued)

*Primary Examiner* — Jason L Vaughan

(74) *Attorney, Agent, or Firm* — Lorenz & Kopf, LLP

(57) ABSTRACT

A bi-cast turbine rotor disk and method of forming the same are provided. The disk includes a ring and a blade. The ring comprises a superalloy that includes a plurality of elements, and the blade extends from the ring. The blade comprises a non-metallic ceramic matrix composite, and at least one element from the superalloy of the ring is diffused into the non-metallic ceramic matrix composite of the blade.

13 Claims, 3 Drawing Sheets

(56) References Cited

U.S. PATENT DOCUMENTS

| | | | |
|---|---|---|---|
| 4,494,287 A | 1/1985 | Cruzen et al. | |
| 4,538,331 A * | 9/1985 | Egan | B22D 19/00 164/101 |
| 4,572,270 A | 2/1986 | Funatani et al. | |
| 4,573,876 A * | 3/1986 | Egan | B22D 19/00 219/121.13 |
| 4,592,120 A | 6/1986 | Egan et al. | |
| 4,728,258 A * | 3/1988 | Blazek | B22C 9/04 164/35 |
| 4,802,828 A | 2/1989 | Rutz et al. | |
| 4,889,177 A | 12/1989 | Charbonnier et al. | |
| 4,955,423 A * | 9/1990 | Blazek | B22C 9/04 164/10 |
| 4,961,459 A * | 10/1990 | Blazek | B22C 9/04 164/10 |
| 4,987,944 A * | 1/1991 | Parks | B22C 9/04 164/10 |
| 5,069,265 A * | 12/1991 | Blazek | B22C 9/04 164/10 |
| 5,181,550 A * | 1/1993 | Blazek | B22D 19/04 164/100 |
| 5,279,892 A * | 1/1994 | Baldwin | B29C 70/08 416/230 |
| 5,290,143 A | 3/1994 | Kington et al. | |
| 5,308,228 A * | 5/1994 | Benoit | B29C 70/543 156/93 |
| 5,536,145 A | 7/1996 | Vandendriessche | |
| 5,547,629 A * | 8/1996 | Diesen | B29C 33/505 264/257 |
| 6,409,473 B1 | 6/2002 | Chen et al. | |
| 7,284,590 B2 | 10/2007 | Liimatainen | |
| 8,397,790 B2 * | 3/2013 | Bariaud | B22C 7/02 164/340 |
| 2006/0239825 A1 | 10/2006 | Rice et al. | |
| 2008/0219853 A1 | 9/2008 | Baker et al. | |
| 2009/0068016 A1 | 3/2009 | Perron et al. | |
| 2010/0054930 A1 | 3/2010 | Morrison | |
| 2010/0150725 A1 | 6/2010 | Krautheim | |
| 2010/0284817 A1 | 11/2010 | Bamberg et al. | |

OTHER PUBLICATIONS

EP Examination Report for Application No. EP 11193628.2 Nov. 2, 2015.

\* cited by examiner

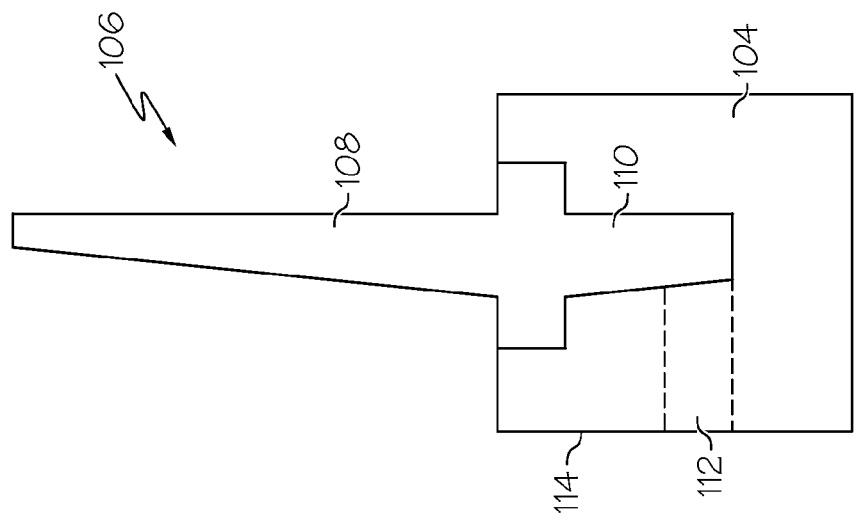

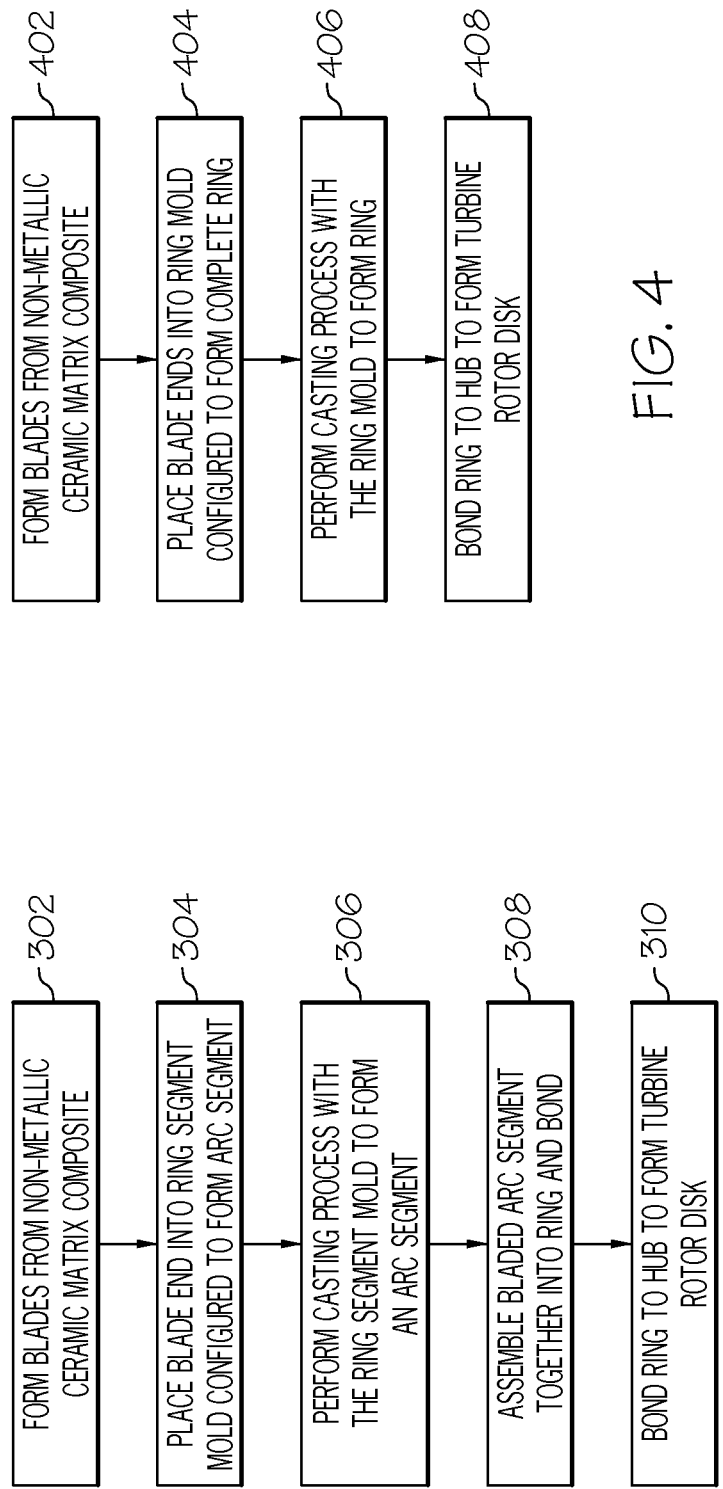

BI-CAST TURBINE ROTOR DISKS AND METHODS OF FORMING SAME

CROSS REFERENCE TO RELATED APPLICATION

This application is a divisional of U.S. application Ser. No. 12/973,424, filed Dec. 20, 2010.

TECHNICAL FIELD

The inventive subject matter generally relates to turbine rotor disks and more particularly relates to methods of forming bi-cast turbine rotor disks.

BACKGROUND

Gas turbine engines may be used to power various types of vehicles and systems, such as air or land-based vehicles. In typical gas turbine engines, compressed air generated by axial and/or radial compressors is mixed with fuel and burned, and the expanding hot combustion gases are directed against stationary turbine vanes in the engine. The gas flow deflects off of the vanes and impinges upon turbine blades of a turbine rotor disk. A rotatable turbine disk or wheel, from which the turbine blades extend, spins at high speeds. Gas turbine engines used in aircraft use power created by the rotating disk to draw more air into the engine and to pass high velocity combustion gas out of the gas turbine aft end to produce a forward thrust. Other gas turbine engines may use the power to turn a propeller or an electrical generator.

The engines may incorporate dual alloy turbine rotor disks. A dual alloy turbine rotor disk may include airfoils and outer rim rotor portions made of a first material having a desired characteristic and a hub made of a second material having another desired characteristic. For example, the airfoils and outer rim portions may include an alloy having relatively high creep rupture strength at the high temperatures, while the hub may be made of another alloy having high tensile strength and low-cycle-fatigue resistance properties.

To produce the dual alloy turbine rotor disks, a unitary blade ring made up of a ring of the airfoils is typically formed. The hub, which is fabricated separately from the blade ring, is then hot isostatically pressed, or otherwise bonded thereto. Manufacturing the dual alloy turbine rotor disk in the aforementioned manner has been relatively cost efficient and simple to perform.

Although the aforementioned dual alloy turbine rotor disks and manufacturing processes have several advantages, they may be improved. In some engines, for example, it would be desirable to operate turbine rotor disks at gas temperatures that may be near or above an incipient melting point of the rotor disk material(s). However, when subjected to these gas temperatures, the alloys may not exhibit the characteristics for which they were initially selected. Additionally, as the demand for more efficient and lightweight engines increases, inclusion of a dual alloy turbine rotor disk into an engine may not be feasible, as such rotors may be relatively heavier than conventional rotors.

Hence, there is a need for a turbine rotor disk that may be used in extreme high temperatures. Moreover, it is desirable for the turbine rotor disk to be relatively inexpensive, lightweight, and simple to manufacture.

BRIEF SUMMARY

In one embodiment, a bi-cast turbine rotor disk includes a ring and a blade. The ring comprises a superalloy that includes a plurality of elements, and the blade extends from the ring. The blade comprises a non-metallic ceramic matrix composite, and at least one element from the superalloy of the ring is diffused into the non-metallic ceramic matrix composite of the blade.

In another embodiment, a method of forming a bi-cast turbine rotor disk includes forming a blade from a non-metallic ceramic matrix composite, placing an end of the blade in a ring segment mold that is configured to form an arc segment of a ring section of the turbine rotor disk, and performing a casting process with the ring segment mold to form the arc segment of the turbine rotor disk from a superalloy.

In yet another embodiment, a method of forming a bi-cast turbine rotor disk includes forming a plurality of blades from a non-metallic ceramic matrix composite, placing an end of each blade in a ring mold configured to form a ring of the turbine rotor disk, and performing a casting process with the ring mold to form the ring of the turbine rotor disk from a superalloy, to thereby diffuse at least one element from the superalloy into the non-metallic ceramic matrix composite of the blades.

Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF DESCRIPTION OF THE DRAWINGS

The inventive subject matter will hereinafter be described in conjunction with the following drawing figures, wherein like numerals denote like elements, and wherein:

FIG. 2 is a cross section view of the turbine rotor disk 100 of FIG. 1 taken along line 2-2, according to an embodiment;

FIG. 3 is a flow diagram of a method of forming a bi-cast turbine rotor disk, according to an embodiment; and FIG. 4 is a flow diagram of a method of forming a bi-cast turbine rotor disk, according to another embodiment.

DETAILED DESCRIPTION

Figure 1:
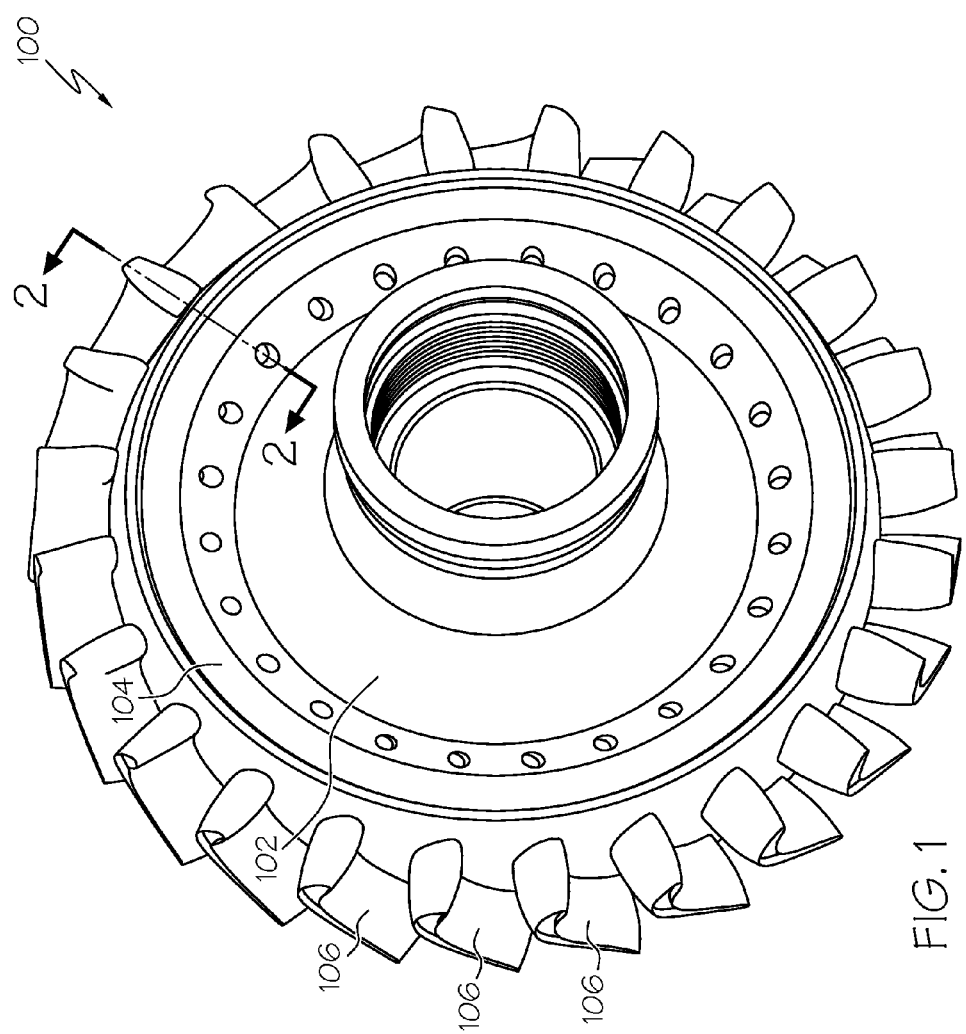
FIG. 1 is a perspective view of a turbine rotor disk, in accordance with an embodiment.

The following detailed description is merely exemplary in nature and is not intended to limit the inventive subject matter or the application and uses of the inventive subject matter. Furthermore, there is no intention to be bound by any theory presented in the preceding background or the following detailed description.

FIG. 1 is a perspective view of a turbine rotor disk 100, according to an embodiment. The turbine rotor disk 100 can be employed in a front end of an engine and may be exposed to temperatures greater than 2100° C. Alternatively, the turbine rotor disk 100 can be employed in a back end of the engine and may be exposed to lower temperatures. In any case, the turbine rotor disk 100 has a hub 102, a ring 104, and a plurality of blades 106 configured to withstand a wide range of temperatures. Generally, the hub 102 is disk-shaped and surrounded by the ring 104. The hub 102 and ring 104 are diffusion-bonded together and are generally formed from superalloy materials. Both components can comprise the same material or can be formed from materials that vary in composition. Suitable materials for fabricating the hub 102 and/or the ring 104 include, but are not limited to, powder metallurgy superalloys, nickel-based superalloy materials such as INCO718, INCO738, MAR-M-247EA, MAR-M-247DS, SC180, Titanium-based superalloy materials such as Ti-6-2-4-2, Ti-6Al-2Sn-4Zr-2Mo, IMI 834, and Ti 1100, and Ti-6-4. The hub 102 and/or ring 104 can be cast into equiaxed, directionally solidified, or single crystal components. The blades 106 extend radially outward from the ring 104.

FIG. 2 is a cross section view of the turbine rotor disk 100 of FIG. 1 taken along line 2-2, according to an embodiment. The blades 106 and ring 104 are bi-cast together. Each blade 106 has an airfoil 108 and a blade attachment section 110, and the ring 104 is metallurgically bonded to the blade attachment section 110 and/or compositional elements of ring 104 are infused into the pores of the blade attachment section 110. To maintain positioning of the blades 106 relative to the ring 104, the blades 106 can be, in some cases, mechanically held within the ring 104. For example, rather than having a shaft configuration, the blade attachment section 110 can include an projection 112 (shown in phantom) for trapping a portion of the blade 106 in the ring 104. In addition to mechanically maintaining the blade 106 within the ring 104, the projection 112 can serve to cool the blade 106 in some embodiments. For example, the projection 112 can be configured to be in contact with a cooling air flowpath. In an embodiment, the projection 112 has a surface 114 that is flush with a surface of the ring 104. Alternatively, the projection 112 extends a distance away from the ring 104.

The blades 106 are formed from ceramic matrix composites such as silicon carbide fiber and silicon carbide matrix. As noted previously, the ring 104 is metallurgically bonded to the blade attachment section 110 and/or compositional elements of ring 104 are infused into the pores of the blade attachment section 110 and thus, elements from the superalloy of the ring 104 diffuse into the ceramic matrix composite of the blades 106. Although 24 total blades 106 are shown, the total number of blades can vary for other turbine rotor disk blade configurations.

FIG. 3 is a flow diagram of a method of forming the turbine rotor disk 100, according to an embodiment. First, one or more blades 106 are formed from a non-metallic ceramic matrix composite, step 302. The non-metallic ceramic matrix composite comprises fiber and non-fiber materials, generally. Suitable materials forming the non-metallic ceramic matrix composite include, but are not limited non oxide CMC's (silicon carbide fibers and silicon carbide matrix, silicon carbide fibers and crystalline matrix, carbon fibers and carbon matrix, carbon fibers and silicon carbide matrix) and oxide CMC's (alumina fibers and alumina matrix, alumina fibers and alumina/mulite matrix). In an embodiment, the fiber and non-fiber materials are provided separately. The fiber materials are placed in a mold having an inner surface contoured to provide the shape of an outer surface of the blade. The mold can be configured for forming a blade having an airfoil and a blade attachment section. The airfoil may be configured similar to airfoil 108 of FIG. 1 and the blade attachment section can be configured similar to blade attachment section 110 of FIG. 2. In another embodiment, the blade attachment section of the mold includes an projection. The projection can be configured similar to projection 112 of FIG. 2.

According to an embodiment, the fiber materials are woven into a fabric and the fabric is used to line the inner surfaces of the mold. In either embodiment, the non-fiber materials are provided in powder, vapor, or liquid form and are disposed within the mold. In another embodiment, the fiber materials are combined with the non-fiber materials and a quantity of the non-metallic ceramic matrix composite is placed in the mold the blade is removed from the mold and, if desired machined to include openings or to improve aerodynamic features of the blade. It will be appreciated that step 203 is repeated as desired to form the desired total number of blades.

Next, an end of the blade is placed in a ring segment mold configured to form an arc segment of a ring section of the turbine rotor disk, step 304. In accordance with an embodiment, the blade end comprises a blade attachment section and is disposed appropriately within the ring segment mold.

A casting process is performed with the ring segment mold to form an arc segment of the turbine rotor disk from a superalloy, step 306. Specifically, wax is injected into the ring segment mold to form a wax mold pattern. A shell made of a heat resistant material, such as a heat resistant ceramic, and is deposited over the wax mold pattern by employing any suitable deposition method. For example, the heat resistant material may be a slurry and the wax mold pattern may be dipped into the slurry. In another embodiment, the heat resistant material may be sprayed onto the wax mold pattern. In any case, after the shell has been deposited and dried, the wax mold pattern may be removed therefrom. For example, the wax mold pattern may be melted and burnt out of the shell to remove any residue of the wax mold pattern.

In an embodiment in which the arc segment comprises a single crystal material, a seed crystal may be inserted into the shell. In an embodiment, the seed crystal may comprise a single crystal superalloy, such as nickel-base single crystal superalloy seed crystal oriented to define predetermined primary and secondary crystallographic orientations of the arc segment. In an embodiment, the predetermined primary orientation may be selected so that a radial direction of the ring 104 has the same orientation as that of a blade 106. For example, both the ring 104 and the blade 106 may have a primary orientation of [100]. In another embodiment, the predetermined secondary orientation of the seed crystal may be the same as that of a single crystal blade attachment section 110 to be attached to the ring 104. Although reference to one seed crystal is made above, it will be appreciated that more may alternatively be used, depending on the total number of seed cavities that make up the wax mold pattern.

Next, the shell is prepared for casting and may be placed onto a chill plate, a vacuum chamber or in a mold heater (not shown), such as a furnace. The portion of the shell not in contact with the chill plate may be preheated to a predetermined temperature above the liquidus temperature of a seed crystal material (e.g., the superalloy), while another portion of the assembly containing the seed crystal material that is attached to the chill plate may be maintained at a temperature below the solidus temperature of the seed crystal material. The predetermined temperature may be in a range of between about 25° C. to 200° C. above the liquidus temperature of the material from which the arc segment is made, in an embodiment.

The arc segment is the formed by melting a superalloy and then pouring the material into the shell. For example, the superalloy may be deposited into a crucible, or other suitable container, and heated to a temperature above the liquidus temperature thereof. In an embodiment, the material may be heated to a temperature in a range of between about 25° C. and 200° C. above its liquidus temperature. In other embodiments, the heating temperature may be higher or lower. The superalloy may be melted using an induction heating coil, in an embodiment. The coil may be used to stir the material as it melts The molten superalloy may then be poured into the shell through a pour cup to form a casting. In an embodiment, after the molten material is poured into the pour cup, the shell may be removed vertically out of the mold heater, which may result in a moving thermal gradient that enables directional solidification of the casting. Directional solidification in the gradient may enable the seed crystal to grow into the cavities of the shell making up the arc segment. After the casting has cooled, it may next be removed from the protective environment and from the shell.

Next, the individual arc segments including the blades are assembled into a ring and bonded together, step 310. The bonded ring forms a full ring comprising a plurality of arc segments. In an embodiment, the arc segments are placed in a bonding fixture and bonded together using a known bonding method. In an example, the arc segments are bonded together by diffusion bonding with the aid of a differential thermal expansion tooling. The tooling can comprise a low alpha Mo tooling or another suitable tooling. In another embodiment, conventional brazing may be used to bond the arc segments together.

In still another embodiment, the arc segments are bonded by a transient liquid phase bonding process. In one particular example, a transient liquid phase material is deposited on the bonding surfaces of each arc segment. The transient liquid phase material includes melting point depressants and is formulated to melt at a temperature below the incipient melting temperature of the single crystal material making up the arc segments. The transient liquid phase material is applied to the bonding surfaces, such as by sputtering or as a superalloy foil including the transient liquid phase material. The arc segments are then loaded into a tooling, such as a thermal expansion tooling. In another embodiment, the tooling may be adapted to place the bonding surfaces of adjacent arc segments into compression. Heat is then applied to the arc segments to thereby melt the depressant. In particular, the melting point depressants in the transient liquid phase material diffuse out of the liquid phase into the adjacent single crystal to thereby raise the melting temperature of the bonded joint. In an embodiment, in which a thermal expansion tooling is used, the tooling may compress the ring of arc segments, which may extrude excess transient liquid phase material from bond joints prior to solidification. The ring may be heated using a furnace or other heating device.

In still yet other embodiments, bonding may be accomplished by casting or injecting a molten bonding alloy into gaps between adjacent arc segments. For example, first, the arc segments may be arranged into a ring in an investment casting mold. In an embodiment, all of the arc segments may be preheated to a temperature of about 1100° C.±100° C., while subjected to a vacuum or an inert gas environment. Alternatively, the arc segments are assembled into a ring assembly fixture that limits heating to at least two adjacent arc segments. In any case, a bonding alloy, such as MARM247, is cast into the gaps between adjacent arc segments. In an embodiment in which the bonding alloy is cast between two adjacent preheated arc segments, the other arc segments remain relatively cold. This process can be repeated until the entire ring has been bonded.

Next, the bladed ring is bonded to a hub to form the turbine rotor disk, step 312. The hub may be formed by a conventional process, such as by powder metallurgy or by forging. In an embodiment, as mentioned above, the hub may comprise a material that is different from the material from which the ring is made. For example, the hub may be made of a nickel-based alloy formulated to withstand higher stresses and temperatures lower than those to which the ring will be subjected. In this regard, the hub may be made of an equiaxed superalloy material, which may be formed from Alloy 10, Astroloy, or U720, to name a few.

An inner diameter of the ring may be machined to a particular dimension before being bonded to the hub, and an outer peripheral surface of the hub may be machined to a particular dimension to improve bonding to the ring. For example, in an embodiment where the ring is shrink fit onto the hub, the inner diameter of the ring may be machined so as to be slightly less than an outer diameter of the hub. In another embodiment, the inner diameter of the ring may be substantially equal in size to the outer diameter of the hub.

In any case, the ring may be bonded to the hub using any one of numerous conventional processes. For example, the ring may be bonded to the hub using heat and pressure. In still another example, the ring may be shrink-fitted to the hub, evacuated and the joined surfaces sealed, and bonding may occur using a hot isostatic pressing process. For example, the hot isostatic pressing process parameters may include pressure, temperature, and time. After bonding, the turbine rotor disk is subjected to a heat treatment. In an embodiment, the heat treatment may occur at temperatures below the bonding temperature of the ring and the hub.

FIG. 4 is a flow diagram of a method 400 of forming the turbine rotor disk 100, according to another embodiment. First, a desired number of blades to be included as part of the turbine rotor disk 100 are formed from a non-metallic ceramic matrix composite, step 402. Step 402 is performed in a manner substantially similar to step 302 of method 300.

Next, an end of each of the blades formed in step 402 is disposed in a ring mold, step 404. Step 404 is performed in a manner substantially similar to that described in step 304 of method 300, except that the ring mold is configured to form a complete ring, and appropriate portions of each blade are placed at desired locations within the ring mold.

A casting process is performed with the ring mold to form a ring of the turbine rotor disk from a nickel-based superalloy, step 406.

In an embodiment in which the ring comprises single crystal material, the casting process can include steps similar to the casting process described above in step 306 of method 300, except that a plurality of seed crystals are placed at desired locations within the shell. As the grains nucleated by the seed crystals grow into the cavities making up the shell, they eventually bond together to thereby form the ring. The bonded ring includes bond lines therebetween. In an embodiment, adjacent grains in the ring have a low-angle grain boundary therebetween with a predetermined crystallographic mismatch across the bond lines. An acceptable angle of crystallographic mismatch across a bond line may be determined by dividing 360 by n, where n is the total number of arc segments of the ring. For example, the crystallographic mismatch may be an angle within a range of between about 6 degrees and about 18 degrees. In other embodiments, the mismatch may be about 10 degrees. In still other embodiments, the mismatch may be greater or less. No matter the nominal mismatch between arc segment grains within the ring, the angles of crystallographic mismatch between adjacent grains within the ring may vary by between about ±4°.

Lastly, the bladed ring is bonded to a hub to form the turbine disk, step 410. Step 410 is performed in a manner similar to that described in step 312 of method 300.

A turbine rotor disk has now been provided that is improved over conventional turbine rotor disks, such as dual alloy turbine rotor disks. By forming the blades from ceramic matrix composites, the turbine rotor disks may be used in temperatures higher than those to which conventional turbine rotor disks are exposed. Additionally, the metallurgical bond between the blades and ring provide improved robustness to the turbine rotor disk. Moreover, the improved turbine rotor disk is relatively inexpensive, lightweight, and simple to manufacture as compared with conventional turbine rotor disks.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A method of forming a bi-cast turbine rotor disk, the method comprising:
   forming a blade from a non-metallic ceramic matrix composite;
   placing an end of the blade in a ring segment mold configured to form an arc segment of a ring section of the turbine rotor disk; and
   performing a casting process with the ring segment mold to form the arc segment of the turbine rotor disk from a superalloy, and to diffuse at least one element from the superalloy into the non-metallic ceramic matrix composite of the blade.

2. The method of claim 1, wherein the step of performing the casting process comprises:
   injecting wax into the ring segment mold to form a wax cast of the arc segment of the turbine rotor disk;
   applying a heat resistant ceramic around the wax cast to form a shell, the blade extending from the shell; and
   disposing the superalloy in the shell to form the arc segment of the turbine rotor disk.

3. The method of claim 2, wherein the non-metallic ceramic matrix composite includes a fiber material and a non-fiber material and the step of forming the blade comprises weaving the fiber material into a fabric, lining a mold having an inner surface configured to have a blade shape with the fabric, and placing the non-fiber material in the mold.

4. The method of claim 3, wherein the fiber material comprises non-oxide fibers and a non-oxide matrix or an oxide fiber and an oxide matrix.

5. The method of claim 1, wherein the blade includes an airfoil and a blade attachment section and the end of the blade in the ring segment mold comprises the blade attachment section.

6. The method of claim 1, further comprising diffusion bonding a plurality of the segments of the ring together to form a complete ring.

7. The method of claim 6, further comprising bonding the complete ring to a hub to form the turbine rotor disk.

8. The method of claim 1, wherein the arc segment of the turbine rotor disk comprises a single crystal material.

9. A method of forming a bi-cast turbine rotor disk, the method comprising:
   forming a blade from a non-metallic ceramic matrix composite;
   placing an end of the blade in a ring segment mold configured to form an arc segment of a ring section of the turbine rotor disk; and
   performing a casting process with the ring segment mold to form the arc segment of the turbine rotor disk from a superalloy,
   wherein the ring segment mold of the step of placing includes an opening and the step of placing comprises extending a portion of the blade attachment section through the opening in the ring mold such that the portion of the blade attachment section extends from the arc segment of the turbine rotor disk.

10. A method of forming a bi-cast turbine rotor disk, the method comprising:
    forming a plurality of blades from a non-metallic ceramic matrix composite;
    placing an end of each blade in a ring mold configured to form a ring of the turbine rotor disk; and
    performing a casting process with the ring mold to form the ring of the turbine rotor disk from a superalloy, to thereby diffuse at least one element from the superalloy into the non-metallic ceramic matrix composite of the blades.

11. The method of claim 10, wherein at least one blade of the plurality of blades comprises an airfoil and a blade attachment section, the ring mold of the step of placing includes at least one opening configured to correspond with the at least one blade, and the step of placing comprises extending a portion of the blade attachment section of the at least one blade through the at least one opening in the ring mold such that the portion of the blade attachment section extends away from the ring of the turbine rotor disk.

12. The method of claim 10, further comprising bonding the ring to a hub to form the turbine rotor disk.

13. The method of claim 10, wherein the non-metallic ceramic matrix composite includes a fiber material and a non-fiber material and the step of forming the blade comprises weaving the fiber material into a fabric, lining a mold having an inner surface configured to have a blade shape with the fabric, and placing the non-fiber material in the mold.

* * * * *